United States Patent [19]

Berisch et al.

[11] Patent Number: 4,542,945
[45] Date of Patent: Sep. 24, 1985

[54] DECELERATION-SENSITIVE BRAKING PRESSURE CONTROL UNIT FOR A VEHICULAR HYDRAULIC BRAKE SYSTEM

[75] Inventors: Volker Berisch, Munich, Fed. Rep. of Germany; Alfred Birkenbach, Rochester, Mich.

[73] Assignee: ITT Industries, Inc., New York, N.Y.

[21] Appl. No.: 545,512

[22] Filed: Oct. 26, 1983

[30] Foreign Application Priority Data

Nov. 3, 1982 [DE] Fed. Rep. of Germany ....... 3240541
Nov. 3, 1982 [DE] Fed. Rep. of Germany ....... 3240536

[51] Int. Cl.[4] .......................... B60T 8/14; B60T 8/26
[52] U.S. Cl. ..................................... 303/6 C; 188/349; 303/24 A; 303/24 C; 303/24 F
[58] Field of Search .................. 303/24 F, 24 C, 6 R, 303/24 A, 6 C, 24 R; 188/349

[56] References Cited

U.S. PATENT DOCUMENTS 3,770,326 11/1973 Vogt ..................................... 303/6 C
4,175,791 11/1979 Nogami ....................... 303/24 C X
4,390,213 6/1983 Berisch ............................. 303/24 A Primary Examiner—Douglas C. Butler
Attorney, Agent, or Firm—James B. Raden; William J. Michals

[57] ABSTRACT

A deceleration-sensitive braking pressure control unit having a ball valve freely movable in an inlet chamber of the housing of the unit. The ball opens or closes a channel for the passage of pressure fluid through a longitudinally slidable, pressurized stepped piston upon attainment of the change-over pressure with the vehicle loaded. The stepped piston is movable in the longitudinal bore of a pressurized annular piston which is supported slidably in the housing. In this arrangement, the annular piston is slidable in the housing to control the pressure fluid passage between its annular end face and the surface of the ball upon attainment of the change-over pressure, with the vehicle unloaded. Both the stepped piston, which contains the channel and the annular piston are comprised of varying effective surfaces acted upon by pressure fluid and are maintained in their initial positions in the housing by springs.

4 Claims, 5 Drawing Figures

DECELERATION-SENSITIVE BRAKING PRESSURE CONTROL UNIT FOR A VEHICULAR HYDRAULIC BRAKE SYSTEM

BACKGROUND OF THE INVENTION

The present invention relates to a deceleration-sensitive braking pressure control unit for a vehicular hydraulic brake system, using a spring-loaded stepped piston. The smaller effective surface of the piston is close to an inlet chamber connected to a braking pressure generator. The larger effective surface of the piston is close to an outet chamber that is connected to at least one wheel brake cylinder. The inlet chamber and outlet chamber communicate through a channel containing a valve constituted by a deceleration-sensitively movable closure member, such as a ball, in the inlet chamber and by a valve seat disposed at the end of the stepped piston that is closest to the valve.

A known arrangement including these features is shown in U.S. Pat. No. 3,770,326 issued Nov. 6, 1973 to H. J. Vogt. In the unit shown by that patent, the stops for the closure member and the sleeve are fixed relative to the housing. With the inlet pressure increasing gradually, the stepped piston will move towards the inlet chamber in opposition to the force of its spring due to the two separate stepped effective surfaces. The minimum distance of valve movement will have been covered at a predetermined change-over pressure; the valve will then be able to close in dependence upon the deceleration-sensitive movement of the closure member (ball). When the valve is closed, the associated second branch of the characteristic curve of the arrangement has less inclination than the first branch which is followed when the valve is opened. A support affixed to the housing is provided on the side of the closure member remote from the stop. The support's distance from the stop amounts to about double the axial length of the closure member.

In this construction, the change-over pressure, and the inclination of the branches of the pressure characteristic curve, are interdependent. This interdependence impairs the optimal dimensioning of the braking pressure control unit. If the closure member remains on the support on a malfunction, the valve will not act at all so that the entire unit fails and the danger of wheel-lock will be increased considerably during operation of the rear-wheel brakes.

SUMMARY OF THE INVENTION

It is an object of the present invention to create a deceleration-sensitive braking pressure control unit of the type referred to with the present design; it is possible to attain an increase of the change-over pressure to a greater extent without added effort. With the present construction, the inclinations of the branches of the pressure characteristic curve are independent of one another, and the inclinations of the branches of the pressure characteristic curve being desired rise in a controlled fashion upon attainment of the change-over pressure. This braking pressure control unit is particularly useful in units in which load-responsive regulators are required.

This object will be achieved according to the present invention in that the stepped piston containing the channel is longitudinally slidably held and guided in the longitudinal bore of an annular piston in opposition to the force of a spring. The annular piston, in turn, including two effective surfaces is movable between stops in a stepped bore of the housing between inlet chamber and outlet chamber in opposition to the force of another spring. The annular piston with its end face close to the inlet chamber includes the ball seat, and is slidable upon pressurization towards the inlet chamber, until the valve seat of the stepped piston is unreachable for the closure member.

Preferably, the annular piston is displaceable in the direction of the inlet chamber in opposition to the force of the spring. The displacement of the stepped piston in the direction of the closure member (ball) is confined by a stop affixed to the housing. Upon abutment of the stepped piston and of the annular piston against their stops which are affixed to the housing and close to the pressure fluid outlet, the end faces of the annular piston and of the stepped piston that are close to the pressure fluid inlet are spaced from one another.

Preferably the annular piston, when in its initial position and with the system unpressurized, is spaced from the ball seat at its annular end face, and from the line of contact which the annular piston forms with the ball surface. This latter distance or spacing is smaller than the distance between the valve seat of the stepped piston and the end face of the annular piston, while the slide travel path of the stepped piston relative to the stop affixed to the housing in the direction of the ball is smaller than the distance between the valve seat and the end face.

In one embodiment of the present braking pressure control unit, a stop provided for the closure member ensures a distance between closure member and valve seat, in the inactive position of the stepped piston. The stepped piston containing the channel is longitudinally slidably held and guided in the longitudinal bore of an annular piston in opposition to the force of a spring. The annular piston, is movable between stops in a stepped bore of the housing between inlet chamber and outlet chamber in opposition to spring force. The end face of the annular piston that is close to the inlet chamber is slidable upon pressurization towards the inlet chamber, until the pressure fluid passage from the inlet chamber to the longitudinal bore of the annular piston is closed by the ball and/or the annular piston abuts against the housing step.

To attain a smooth passing over in the control behaviour of the braking pressure control unit, the stepped piston has at its end, which is closest to the inlet chamber and contains the valve seat, a sleeve which is longitudinally slidable by a small amount in opposition to the force of a spring. The sleeve encompasses the valve seat at the end of the channel that is close to the inlet chamber and is movable into contact with the circumferential surface of the ball.

In the event of pressure decrease, the ball which is movably disposed in the inlet chamber is advantageously arranged to move between a stationary stop and a baffle plate that is displaceable by a small amount in opposition to the force of a spring to enable pressure reduction on the outlet side.

The displacement of the pistons during pressure build-up in the direction of the inlet chamber, as required for the purpose of the braking pressure control desired, will be reliably accomplished by having the large effective surface of the annular piston face the outlet chamber, while the small effective surface of the stepped piston movable in the annular piston faces the inlet chamber. The stepped piston is slidable in a longitudinal direction in relation to the annular piston by a slightly larger amount, than the annular piston, in turn, is slidable in relation to its stops formed fast with the housing.

To ensure that both pistons are in their initial position at the end of the housing bore close to the outlet chamber prior to the braking action, and that there is free pressure fluid flow from the inlet chamber through the pressure fluid passage between ball and the end face of the annular piston and the channel to the outlet chamber, the annular piston is suitably supported in relation to the housing by a spring. One end of the piston abuts against the step of the housing bore while its other end abuts against the head portion of the annular piston forming a step, and the stepped piston is acted upon by a spring which bears againt a step of the end of the annular piston that is close to the inlet chamber.

BRIEF DESCRIPTION OF THE DRAWINGS

The present invention will be described in greater detail by way of embodiments illustrated in the accompanying drawings. In the drawings.

DETAILED DESCRIPTION

Figure 1:
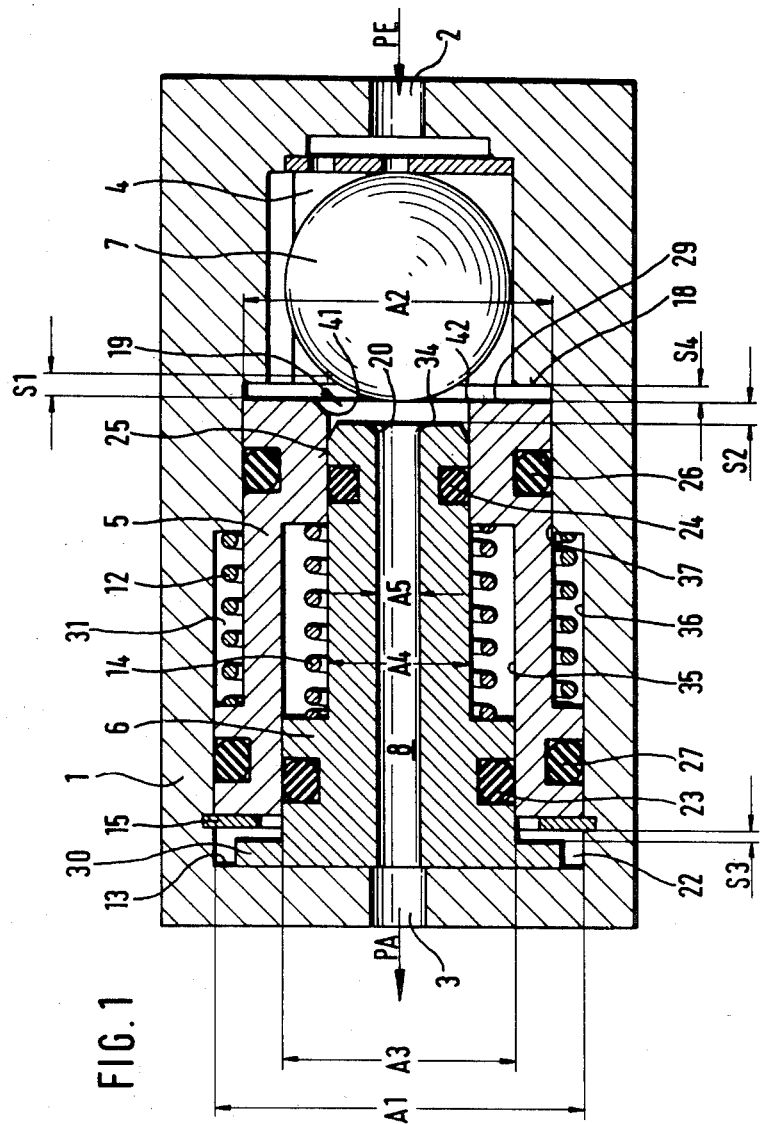
FIG. 1 is a longitudinal cross-section through a first embodiment of the unit according to this invention.

The deceleration-sensitive braking pressure control unit comprises a housing 1 whose interior is through a pressure fluid inlet 2 connected to a pressure generator, in particular a master cylinder of a power brake system.

The inlet pressure PE is introduced at the pressure fluid inlet 2. At the opposite end of the housing 1, an outlet 3 for pressure fluid PA is provided which is connected to a brake circuit (not shown), for example, to the wheel cylinders at the rear axle of an automotive vehicle; the outlet pressure PA being discharged at this outlet.

The pressure fluid inlet 2 is in communication with an inlet chamber 4 which is through a pressure fluid passage 19 and via a channel 8 constituting an open bore through a stepped piston 6 to the pressure fluid outlet 3. An outlet chamber 22 at the pressure end of housing bore provides communication with outlet 3. The passage of pressure fluid through passage 19 is controlled by a closure member, which is arranged in the inlet chamber 4 and has the shape of a ball 7, and by a valve seat 20 about the entrance to channel 8 at the end of the stepped piston 6 close to the inlet and by the ball seat 42, respectively, having a chamber 41 at the end face 29 of the outer annular piston 5.

The stepped piston 6 is guided along its portion of larger effective surface A3 within the annular piston 5 through intermediary of an annular seal 23. Its portion of smaller effective surface A4 is guided through the intermediary of an annular seal 24 in a longitudinal bore 25 of the annular piston 5 which latter, in turn, is guided with its effective surface A1 through the intermediary of seals 26 and 27 in respective steps of a stepped housing bore areas 36 and 37. A compression spring 12 urges the annular piston 5 in the inactive position against the stop 15 of the housing 1. This spring 12 is located in an annular chamber 31 communicating with the atmosphere.

At its end close to the inlet, the annular piston 5 comprises the ball seat 42 about its axial bore, the seat including chamber 41 against which the ball 7 rests in the actuated position of the brake.

Reference character A4 designates the free cross-section of the longitudinal bore 25 of the annular piston 5. In the brakes's initial or normal position, the ball 7 is at a minimum distance S1 from the end face 29 of the annular piston 5. Annular piston 5 is able to move through a displacement stroke S4 which is less than the distance S1 between ball surface and valve seat 42, until the piston 5 abut against the housing step 18.

To define its end position, the stepped inner piston 6 includes a collar 30 which is movable between the stop 15 and the end face 13 of the stepped bore 36 through a distance S3. The defined displacement stroke S3 of the stepped piston 6 is shorter than the stroke S2 of ball 7 to enable closure of the pressure fluid passage 19 at the valve seat 20 in the extreme position.

A braking pressure control unit of the type shown herein is mounted in an automotive vehicle such that the inlet end lies deeper than the outlet end. Usually, the brake circuit for the rear wheels is controlled by via the control unit, while the brake circuits for the frontwheels are fed by the pressure of the master cylinder directly. Arrangements of this type work automatically dependent on the vehicle load, because with higher load a corresponding deceleration will be caused at a higher braking pressure only, as a result the change-over pressure will rise automatically.

The mode of operation of the embodiment of FIG. 1 will now be explained in detail: when the inlet pressure PE rises continuously with the vehicle loaded, first the outlet pressure PA will follow. The valve cannot close, as the ball 7 is kept at a distance from the ball seat 42. In the event of higher pressure, however, a sufficient force acts on the surface (A1−A3) of the annular piston 5 remote from the inlet chamber 4 that the spring 12 is compressed, the annular piston 5 moves to the right a distance S1 that the ball 7 can move into contact with the ball seat 42 at the end face 29 and that a control action will not take place, since the valve seat 20 remains unreachable for the ball 7 ($P_2$). Whether this happens and/or when this happens depends on the load and the instantaneous deceleration of the vehicle. With the vehicle unloaded, the pressure fluid passage 19 is able to close at once upon attainment of the change-over pressure ($P_1$), since the ball 7 reaches the valve seat 20 prior to the annular piston 5 starting to move in the direction of the housing stop 18 and reaching the shoulder on the housing acting as step 18.

An important condition for the proper operation of this embodiment of the braking pressure control unit shown in detail in the drawing is the dimensioning of the clearance dimension S1 of the annular piston 5 in relation to the ball 7, of the clearance dimension between the stepped piston 6 and the annular piston 5 and of the outer surface of the ball 7. The conditions should be:

S1 < S2
S3 < S2
S3 < S2 − S1
S1 − S4 < S2 − S3

Figure 2:
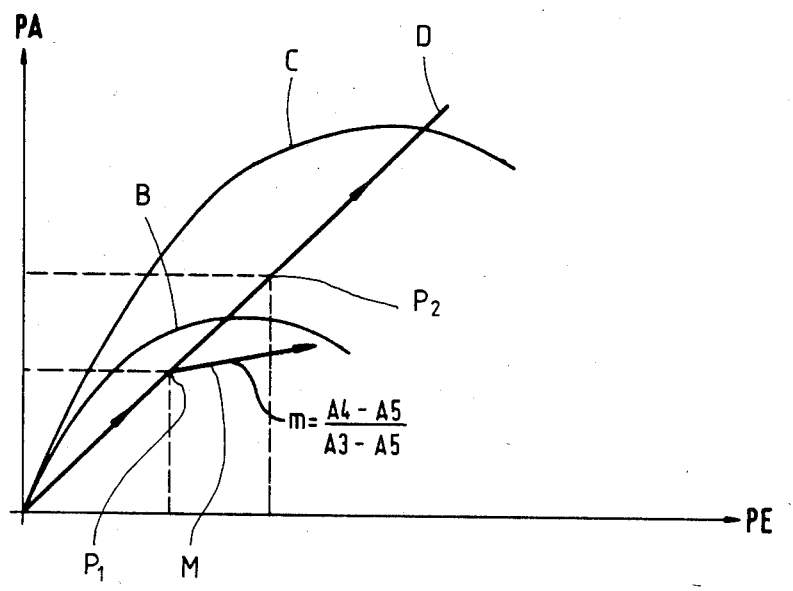
FIG. 2 is the graph of a characteristic control curve attained by the unit in FIG. 1.

In FIG. 2, the curve C illustrates the ideal pressure increase for a loaded vehicle, while curve B shows the ideal pressure increase for an unloaded vehicle. M is assigned to the controlled brake pressure for an unloaded vehicle, while D refers to the unreduced brake pressure.

Figure 3:
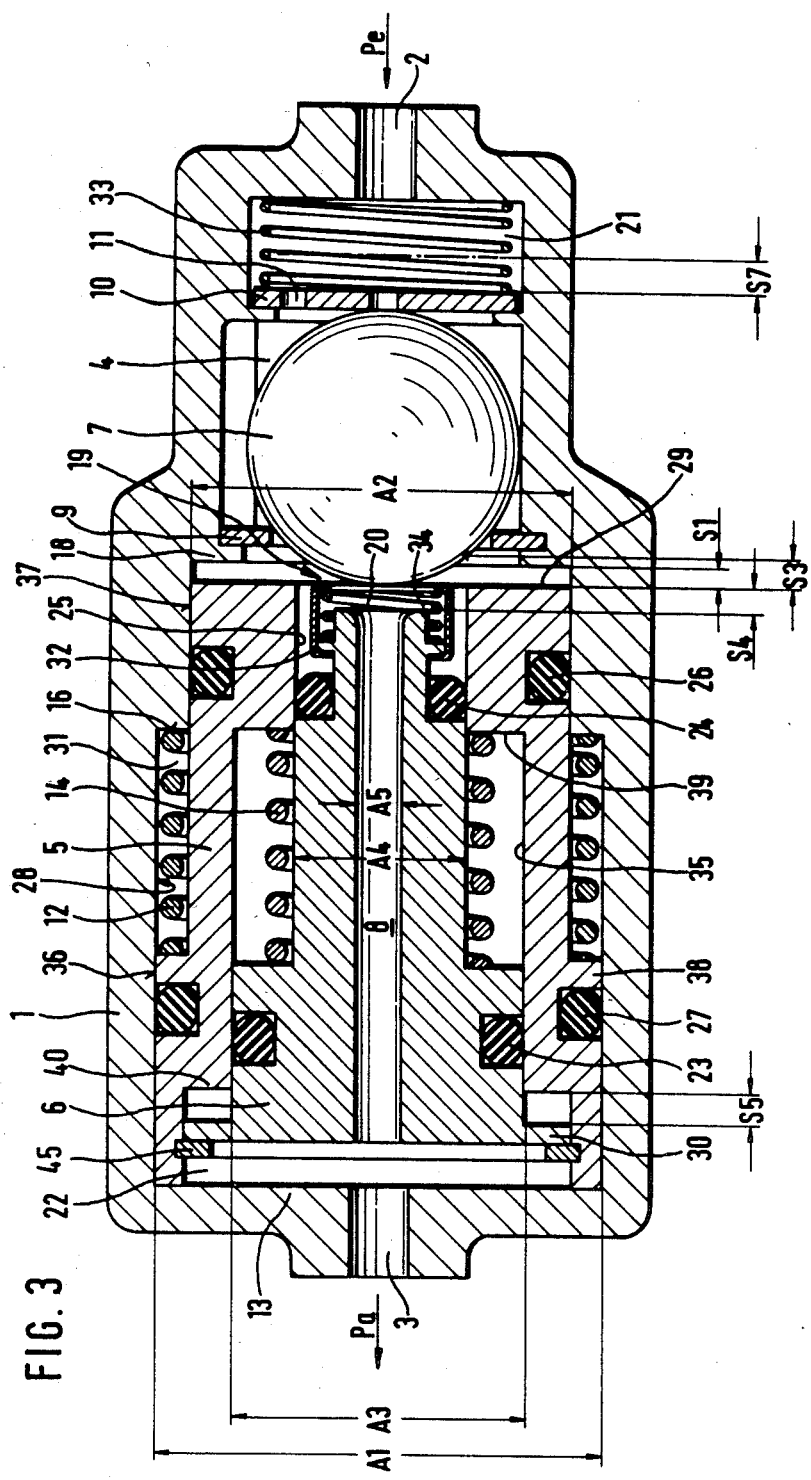
FIG. 3 is the longitudinal cross-section through a second embodiment of a braking pressure control unit.

The embodiment shown in FIG. 3 comprises a housing 1 whose interior communications via a pressure fluid inlet 2 with a pressure generator such as a master cylinder of a power brake system.

The inlet pressure PE is introduced at the pressure fluid inlet 2. At the opposite end of the housing 1, a pressure fluid outlet 3 is provided which is connected to a brake circuit, such as the wheel cylinders at the rear axle of an automotive vehicle; the outlet pressure PA being discharged at this outlet.

The pressure fluid inlet 2 leads to an antechamber 21 in communication with an inlet chamber 4. The inlet chamber housing the ball valve 7 leads to a pressure fluid passage 19 and channel 8, an outlet chamber 22, leading to the pressure fluid outlet 3. The channel 8 is a central bore of stepped piston 6'. The pressure fluid passage 19 is formed by a closure member, which is arranged in the inlet chamber 4 and has the shaped of a ball 7, cooperative with a valve seat 20 at the inlet end of the stepped piston 6'.

The stepped piston 6 is guided in the area of its larger effective surface A3 in the bore of an annular piston 5' through the intermediary of a seal 23. In its area of smaller effective surface A4 stepped piston 6' is guided through the intermediary of a seal 24 in a longitudinal bore 25 of the annular piston 5'. The annular piston 5' is guided through the intermediary of seals 26, 27 in a stepped housing bore 36, 37. In the inactive position, a spring 12 urges the annular piston 5' toward the pressure outlet against the end wall 13 of the housing 1. This spring 12 is located in an annular chamber 31 communicating with the atmosphere.

At its end close to the inlet, the annular piston 5' comprises the end face 29 against which the ball 7 moves in the braking position thereby closing the pressure fluid passage 19.

The reference character A4 designates the free cross-section of the valve seat 20 of the stepped piston 6'. The stop 9 in the inlet chamber 4 normally keeps the ball 7 at a minimum distance S3 from the end face 29 of the annular piston 5'. Until it abuts against housing step 18, the annular piston 5' is able to move through a displacement stroke S1 which is to be less than the distance S3. A baffle plate 10 with a central opening and at least one opening spaced from the plate axis is biased by spring 33 toward ball 7. The yielding stroke S7 of the baffle plate 10 is dimensioned such that the ball 7 will be able to move away from the stop 9 in the event of the annular piston 5 having assumed its right-hand end position, this position dependent on the structural conditions and the maximum amount of the inlet pressure PE.

To define its limit positions, the stepped piston 6' includes adjacent its outlet end a collar 30 whose stroke S5 is defined by limit stops 40 and 45 at the end face of the annular piston 5'. The displacement stroke S5 of the stepped piston 6' has to be greater than S3 to enable closure of the pressure fluid passage 19 at the valve seat 20 in the extreme position.

Figure 5:
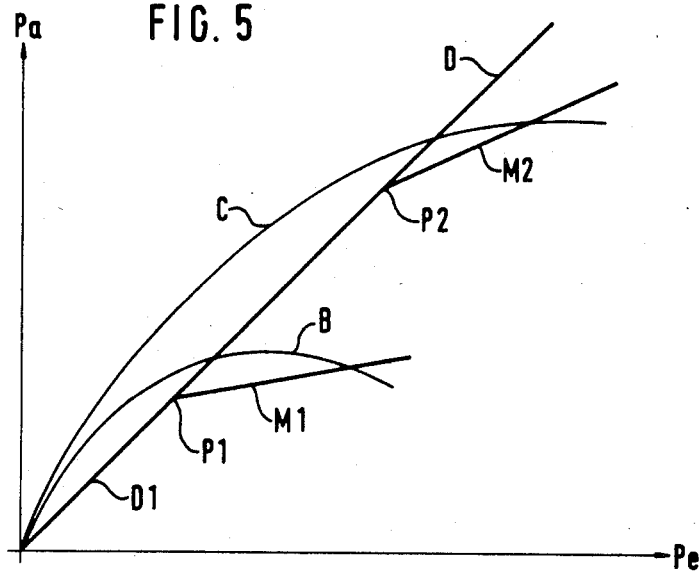
FIG. 5 is a graph of a characteristic curve of the unit according to FIG. 3.

A braking pressure control unit of this type is mounted into an automotive vehicle such that the inlet end lies inwardly of the outlet end. Usually, the brake circuit for the rear wheels is controlled by the control unit, while the brake circuits for the front wheels are fed with the pressure from the master cylinder directly. As shown in the diagram of FIG. 5 the abscissa indicates the braking pressure for the front axle, while the ordinate indicates the braking pressure for the rear axle. This type of arrangement works automatically in dependence upon the vehicle's load, because with higher load a corresponding deceleration will be caused at a higher braking pressure only, as a result whereof the change-over pressure will rise automatically.

Figure 4:
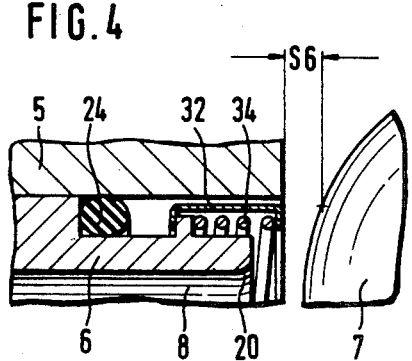
FIG. 4 is a partial longitudinal cross-section according to FIG. 3, with the effective surfaces and clearances of motion being specially marked.

The mode of operation of the embodiment of FIGS. 3 and 4 will be explained in more detail relative to the graph of FIG. 5. The ideal curve B applies to an unloaded vehicle, while the ideal curve C characterizes a loaded vehicle. The actual course of curve during normal operation is as follows: with the inlet pressure Pe rising continuously, the outlet pressure Pa follows along the first branch D1 of the steeper characteristic curve D. Until attainment of the change-over pressure P1, the valve is not allowed to close because the closure member 7 is maintained at a distance from the valve seat 20 by the baffle plate 10. Upon attainment of the change-over pressure P1, the force acting on the surface (A1−A3) of the annular piston 5 remote from the inlet chamber 4 becomes so high that, while the spring 12 is compressed, the annular piston 5' is moved to the right by such an amount of the distance S1 to allow the ball to move into contact with the valve seat at the end face 29. A control action will then take place. If and when this occurs depends on the load and the instantaneous deceleration of the vehicle. When the vehicle is unloaded, for example, the pressure fluid passage 19 is able to close at once upon attainment of the change-over pressure P1 so that the curve section M1 becomes effective in which, with the inlet pressure rising, the outlet pressure will rise in a reduced fashion pursuant the condition $M1=(A2-A4)/(A1-A4)$. If the vehicle is loaded, the pressure fluid passage will not close until attainment of a higher inlet pressure P2, wherefrom results the course of curve along the section M2.

When the vehicle is loaded, the stepped piston 6' will move to the right during the braking action in opposition to the force of the spring 14 prior to the ball 7 lifting from the baffle plate 10, and will prevent the annular piston 5' from abutting with its end face 29 on the ball 7 and closing the pressure fluid passage at 19, or the ball 7 will be inhibited by the stepped piston 6' from moving to the right before it reaches the stop 9, so that the annular piston 5' will have no contact with the ball 7, even after having overcome the distance S1. After a corresponding pressure increase, the stepped piston will now assume the valve closed position caused by the sleeve 32 which is arranged in the area of its end face and acted upon by a spring 34, with $M2=A4/A3$. With the displacement stroke of the stepped piston 6 continuing, the ball 7 will finally move into sealing engagement with the annular piston, were $M1=(A4-A5)/(A3-A5)$. Sleeve 32 is a cylindrically cup shaped device having a circular opening in its end face acted on by spring 34 an end of stepped piston 6'.

The baffle plate 10 acted upon by the spring 33 during pressure decrease (i.e. when the braking action has been completed) allows the pressure removal on the outlet side, as soon as $Pe=Pa+(spring\ 33)/(A5)$, while the spring rate of the spring 33 is to be chosen as low as possible.

An important condition for the proper operation of the embodiment of the braking pressure control unit shown in FIG. 3 is the dimensioning of the clearance of motion S3 of the annular piston 5' relative to the ball 7, and the clearance of motion S5 between the stepped piston 6' and the annular piston 5' and of the outer surface of the ball 7. The conditions should be:

$S3 < S1 + S2$
$S5 > S4$
$S6 > S2$
$S5 < S4 + S7$

We claim:

1. A deceleration-sensitive pressure control unit for the hydraulic brake system of an automotive vehicle in which said unit comprises a housing having an inlet from a source of hydraulic fluid and an outlet, connected to a wheel cylinder of the vehicle, a valve mechanism and a flow channel serially disposed between said inlet and outlet, said valve mechanism including a ball valve and a valve seat, said valve seat comprising the entrance to said channel, said channel including a central bore through a stepped piston with said channel entrance comprising the face of a stepped piston within said housing, the invention wherein there is annular piston disposed concentrically about said stepped piston, a housing step to provide a limit stop for the axial travel of the annular piston toward the housing inlet, a face step on the outlet side of the annular piston and a ring fit in an extended section of the annular piston, the face step and the ring forming limit stops for a collar extending from the outlet end of the stepped piston to limit the axial movement of the stepped piston within the annular piston, said annular piston positioned to contact the ball valve with the annular piston adjacent the limit stop at the channel entrance to space said ball valve from said valve seat to enable the continuation of flow of hydraulic fluid through said channel and said ball valve movable into channel closing relation with said valve seat with said annular piston adjacent its limit stop toward the outlet chamber, and wherein the stepped piston has a sleeve adjacent the valve seat which is longitudinally slidable by an amount in opposition to the force of a spring, said sleeve embracing annularly and encircling the valve seat at the entrance end of the channel close to the inlet chamber and being movable into contact with the surface of the ball valve.

2. A braking pressure control unit as claimed in claim 1, in which the ball valve is movably arranged in the channel entrance and is movable between a stationary stop and a baffle plate, the baffle plate being displaceable by an amount in opposition to the force of a spring.

3. A braking pressure control unit as claimed in claim 2, in which a large effective surface of the annular piston faces the outlet, while a smaller effective surface of the stepped piston movable in the annular piston is arranged facing the inlet, with the stepped piston being slidable in a longitudinal direction in relation to the annular piston by a slightly larger amount than the annular piston which, in turn, is slidable in relation to its stops.

4. A braking pressure control unit as claimed in the claim 1, in which, the annular piston is supported in relation to the housing by a spring one end thereof abuts on a step of the bore of the housing while its other end abuts against the portion of the annular piston forming a step and in which, the stepped piston is acted upon by a spring which bears against a step of the end of the annular piston, adjacent the inlet.

* * * * *